Patented Apr. 27, 1943

2,317,587

UNITED STATES PATENT OFFICE 2,317,587

POLYMERIZATION - FURFURALDEHYDE CONDENSATION PRODUCT OF CASHEW NUT SHELL LIQUID DISTILLATION RESIDUE AND METHOD

Solomon Caplan, New York, N. Y., assignor to The Harvel Corporation, a corporation of New Jersey No Drawing. Application July 17, 1940, Serial No. 345,983

5 Claims. (Cl. 260—46)

The present invention relates to products obtained by the condensation of a polymer of a cashew nut shell liquid distillation residue with furfuraldehyde, and to methods and steps of making and using the same.

Reference is hereby made to U. S. Patent Number 2,098,824 of November 9, 1937, to Harvey for a disclosure of methods for obtaining cashew nut shell liquid residues suitable for use in the practice of the present invention.

The present application is a continuation in part of my copending application Serial No. 291,901 filed August 25, 1939, and, thereby, of my application Serial No. 109,470, filed November 6, 1936, now Patent No. 2,176,059, issued Oct. 17, 1939.

Illustrative examples of methods and steps of making the products of the present invention are as follows:

*Example 1.*—About five parts by weight of diethyl sulphate and about twenty parts by weight of furfuraldehyde are dissolved in a cashew nut shell liquid residue obtained by distilling cashew nut shell liquid with steam until about fifty per cent by weight of the cashew nut shell liquid had been taken off as a distillate. This solution is then heated at about 160° F. to produce simultaneous polymerization of the cashew nut shell liquid residue and condensation thereof with the furfuraldehyde. When the heating is carried on for about three hours the product is flexible. When the time of heating is about twelve hours the product is hard and can be comminuted to a powder or dust.

*Example 2.*—About one hundred parts by weight of the cashew nut shell liquid residue described in Example 1 above, about twenty parts by weight of furfuraldehyde and ten parts by weight of diethyl sulphate are dissolved together and cured at from about 150° F. to about 200° F. When cured for about three hours the product is flexible, and when cured for about twelve hours the product is hard and can be comminuted to a powder or dust.

*Example 3.*—About one hundred parts by weight of the cashew nut shell liquid residue described in Example 1, above, and twenty parts by weight of furfuraldehyde were mixed and heated together in a closed container for about four hours at about 240° F. after which the product was allowed to cool to room temperature when about five parts by weight of diethyl sulphate were mixed in. This intermediate product has a gel time of about twenty minutes at about 250° F. during which time it has somewhat of a body but is plastic and can be molded and used for making laminations. The product is set to an infusible state by curing at about 250° F. for about sixteen hours. For molding purposes fillers can be mixed in at the plastic state. For making laminations and for other purposes the intermediate product can be thinned with a solvent such as xylol which is driven off during the first stages of the heating for curing.

*Example 4.*—About one hundred parts by weight of the cashew nut shell liquid residue described in Example 1 above, about twenty parts by weight of furfuraldehyde and one part by weight of diethyl sulphate were mixed together and cured at about 220° F. in a loosely closed mold or container for about sixteen hours. The product was a rubbery solid which could be cut or sliced with a hand saw, and the product can be cured to a harder state, for example, by heating at about 220° F. for about ten to sixteen hours.

Other materials can be mixed with the cashew nut shell liquid residue to obtain particular characteristics for particular uses.

*Example 5.*—About one hundred parts by weight of the cashew nut shell liquid residue described in Example 1 above, and sixty parts of a chlorinated diphenyl resin sold under the trademark name of "Aroclor" are heated together at about 160° F., after which about ten parts by weight of diethyl sulphate and twenty parts of furfuraldehyde are mixed in and the mixture cured at about 160° to about 180° F. in a mold or other confining form. This product has the characteristic of increased flame resistance in addition to the other characteristics of the products of the present invention.

*Example 6.*—A product is made and cured in the manner of and by steps similar to those used in Example 1 above, except that about ten parts by weight of diethyl sulphate and three parts by weight of furfuraldehyde were used.

*Example 7.*—About one hundred parts of a cashew nut shell liquid residue similar to that of Example 1 but which is the residue after about 65% of the weight of the cashew nut shell liquid has been distilled off, about five parts by weight of diethyl sulphate and 20 parts by weight of furfuraldehyde are mixed together, cured at about 200° F. to obtain a solid product. This product is suitable for formation in situ about electrical coils to serve as an electrical insulation which will mechanically hold the coils in place, will resist water, moisture, oils and chemicals, and remain uniform in characteristics over a wide range extending both above and below normal temperature.

The above examples are given by way of illustration. Variations can be made in the proportions of reactants and polymerizing agent to obtain products of various physical characteristics such as hardness, softness, rigidity, flexibility and so on to suit various uses. Instead of the diethyl sulphate used in the examples given above, various equivalents can be used such as dipropyl sulphate, acid ethyl sulphate, acid propyl sulphate and mixtures of these, that is, of two or more of them, and mixtures of these or of other equivalents with sulphuric acid.

*General example.*—As a general example it is set forth that, according to the present invention, the residue of cashew nut shell liquid, marking nut shell liquid or japanese lac which has been destructively distilled with steam to remove from about 25% to about 75% thereof as distillate can be heated with from about 1% to about 10% of its weight of dialkyl sulphate and with from about 1% to about 20% of its weight of furfuraldehyde to produce simultaneous polymerization of said residue and condensation thereof with said furfuraldehyde.

The proportion of dialkyl sulphate (or equivalent) to cashew nut shell liquid residue can be from about 1% to about 20% by weight of the cashew nut shell liquid residue and the proportion of furfuraldehyde to cashew nut shell liquid residue can be from about 1% to about 20% by weight of the cashew nut shell liquid residue.

The products of the present invention are suitable for use in making articles and structures by formation in molds with or without pressure, by formation in casting molds, by building up in one or more layers and by coatings applied with or without solvents which are removed before the product reaches a final state of cure, to form flexible coating and non-flexible coatings according to the procedure used, and the products of the present invention are suitable for use as electrical insulation, separators and other parts in electrical storage batteries, protection against water, moisture, solvents and oils, oxidizing agents and agents chemicals generally both acid and alkaline.

Distillation residues of marking nut shell liquid and of japanese lac, obtained by methods disclosed above for obtaining cashew nut shell liquid residue, can be used in place of all or part of the cashew nut shell liquid residue in the above general and particular examples and in the claims.

In addition to the "Arochlor" of Example 5, other materials which can be mixed with the cashew nut shell liquid residue (or marking nut shell liquid residue or japanese lac residue) before or during its subjection to polymerization and condensation with furfuraldehyde are, as examples, drying oils and other oils such china wood oil, linseed oil, perilla oil, pine oil, cotton seed oil, phenols such as carbolic acid, the cresols, severally or in various mixtures, the xylenols, the naphthals, anthranols, including the various homologous forms thereof and chlorination modification of the above and other phenols including chlorinated cashew nut shell liquid and chlorinated derivatives of cashew nut shell liquid such as chlorinated cashew nut shell liquid residue. These materials will be subject to polymerization, co-polymerization and condensation with the cashew nut shell liquid residue (or equivalent) material and the phenols will be subject to condensation with the furfuraldehyde in which case additional furfuraldehyde is supplied to make up the amount of furfuraldehyde necessary for condensation with both the cashew nut shell liquid residue (or equivalent) material and the other phenol used. Also other aldehyde material can be used with the furfuraldehyde both when the cashew nut shell liquid residue (or equivalent) material is used without another phenol and also when another phenol is used therewith, such other aldehyde material being, for example, formaldehyde, paraformaldehyde, other forms of formaldehyde such as trioxymethylene and hexamethylene tetramine.

The products of the present invention are suitable also for making friction elements such as brake linings and clutch facing and others such as are described in patents to Harvey 2,164,326 and 2,165,140 issued July 4, 1939, to which reference is hereby made for disclosures of methods and steps for making such friction elements, and the products of the present invention can be incorporated into the friction elements in the various ways disclosed in said Harvey patents including the incorporation of products which have been reduced to the comminuted form before incorporation and also products which are cured or otherwise formed in situ in the friction elements.

Having thus described my invention, what I claim and desire to protect by Letters Patent is:

1. The method for producing a dry and infusible resin comprising heating a mixture of a dialkyl sulphate, furfuraldehyde and a residue material selected from the group consisting of cashew nut shell liquid, marking nut shell liquid and japanese lac, which has been destructively distilled with steam to remove from 25 to 75% thereof as distillate and to leave a residue.

2. The method for producing a dry and infusible resin comprising heating a mixture of a dialkyl sulphate, furfuraldehyde and a residue material selected from the group consisting of cashew nut shell liquid, marking nut shell liquid and japanese lac, which has been destructively distilled with steam to remove from 25 to 75% thereof as distillate and to leave a residue, the quantity of said dialkyl sulphate by weight being between 1 to 20% of the weight of said residue and the quantity of said furfuraldehyde being between about 1 to 20% of said residue.

3. The method for producing a dry and infusible resin comprising heating a mixture of diethyl sulphate, furfuraldehyde and a residue material selected from the group consisting of cashew nut shell liquid, marking nut shell liquid, and japanese lac, which has been destructively distilled with steam to remove from 25 to 75% thereof as distillate and to leave a residue.

4. The method for producing a dry and infusible resin comprising heating a mixture of diethyl sulphate, furfuraldehyde and a residue material selected from the group consisting of cashew nut shell liquid, marking nut shell liquid and japanese lac, which has been destructively distilled with steam to remove from 25 to 75% thereof as distillate and to leave a residue, the quantity of said diethyl sulphate by weight being between about 1 to 20% of the weight of said residue and the quantity of said furfuraldehyde being between about 1 to 20% of said residue.

5. A composition of matter comprising a dry and infusible resin obtained by heating a mixture of a dialkyl sulphate, furfuraldehyde and a residue material selected from the group consisting of cashew nut shell liquid, marking nut shell liquid, and japanese lac, which has been destructively distilled with steam to remove from 25 to 75% thereof as distillate and to leave a residue.

SOLOMON CAPLAN.